3,168,446
    PRODUCTION OF 5'-NUCLEOTIDES AND OF
                  NUCLEOSIDES
Einosuke Omura, Toyonaka, Koichi Ogata, Minoo, Yukio
  Sugino, Osaka, Seizi Igarasi, Ashiya, Masahiko Yoneda,
  Kobe, Yoshio Nakao, Osaka, and Ikuo Suhara, Nishino-
  miya, Japan, assignors to Takeda Pharmaceutical In-
  dustries, Ltd., Osaka, Japan
No Drawing. Filed Mar. 19, 1959, Ser. No. 800,396
    Claims priority, application Japan Mar. 21, 1958
               19 Claims. (Cl. 195—28)

This invention relates to the production of 5'-nucleo-tides and of nucleosides.

Nucleic acids, which are widely distributed in living bodies as non-protein components in nucleoproteins and which have close relation to living phenomena, are essential components of living bodies and are constructed of various nucleotides.

Of these nucleotides, the 5'-nucleotides are compounds which are important as useful reagents for biological research. Moreover, they are now being used as seasoning material for foods, and as therapeutics or therapeutic intermediates.

In spite of the wide distribution of the 5'-nucleotides in natural sources as components of ribonucleic acids, the 5'-nucleotides have been regarded as compounds hardly obtainable in pure state, because there has been no suitable method for hydrolyzing ribonucleic acids into 5'-nucleotides, and therefore their use has been extremely limited up to the present.

Both chemical and biochemical processes are known for hydrolyzing ribonucleic acids. The chemical process, however, does not give 5'-nucleotides, but 2'- and/or 3'-nucleotides. And, as one of the biochemical processes, there has been known a process in which ribonucleic acids or hydrolytic products thereof are further hydrolyzed with phosphodiesterase from snake venoms or from a mucous membrane of bovine small intestines. This method, however, has such deficiencies as low yield of 5'-nucleotides and difficulty of obtaining the enzymes to be used. Therefore, this method is hardly applicable to an industrial production of 5'-nucleotides.

A primary object of the present invention is the embodiment of a practicable method for the production of 5'-nucleotides and/or nucleosides on an industrial scale. This object is realized according to the present invention by the hydrolysis of ribonucleic acids or oligoribonucleotides by means of ribonuclease, employing for this purpose the hereinafter specifically disclosed microorganisms, as such or in the form of the enzymes produced thereby, whereby the 5'-compounds are predominantly obtained.

Ribonucleic acids which can be used as the starting material of the method of this invention may be obtained from such natural sources as yeast and animal tissues, and oligoribonucleotides obtained by partial hydrolysis of ribonucleic acids may also be employed as starting material. Unrefined ribonucleic acid- or oligoribonucleotide-containing substances such as aqueous yeast extracts may also be employed as the starting material. Since these comprise, as is well known, adenylic acid, cytidylic acid, uridylic acid, guanylic acid, etc., the product in such case is a mixture of 5'-mononucleotides or a mixture of nucleosides produced therefrom by the separation of phosphoric acid.

These mixtures as such have, of course, various uses as introductorily described, but, if necessary, each component may be separated, by per se known methods.

For the purpose of this invention, various kinds of microorganisms or enzymes produced thereby are utilized. These microorganisms are included in such classes as Schizomycetes, Fungi Imperfecti, etc. Microorganisms belonging to genus Fusarium, genus Verticillium, genus Gliomastix, genus Helminthosporium, genus Bacillus, genus Streptomyces, etc. are particularly useful. Microorganisms which can be used for the purpose of this invention are, as follows, for example:

*Fusarium roseum* Link,
*Fusarium solani* (Mart.) Appel and Wollenweber,
*Verticillium niveostratosum* Lindau,
*Gliomastix convoluta* (Harz.) Mason var. *felina* (Marchal) Mason,
*Helminthosporium sigmoideum* var. *irregulare* Cralley and Tullis,
*Bacillus subtilis* Cohn emend. Prazmowski,
*Bacillus brevis* Migula emend. Ford,
*Streptomyces griseus* (Krainsky emend. Waksman et al.) Waksman et al.,
*Streptomyces coelicolor* (Müller) Waksman and Henrici,
*Streptomyces flavus* (Krainsky) Waksman and Henrici,
*Streptomyces lavendulae* (Waksman and Curtis) Waksman and Henrici,
*Streptomyces ruber* (Krainsgy) Waksman and Henrici,
*Streptomyces viridochromogenes* (Krainsky) Waksman and Henrici,
*Streptomyces purpurescens* Lindenbeim,
*Strdeptomyces albogriseolus* Benedict et al.,
*Streptomyces olivochromogenus* (Bergey et al.) Waksman and Henrici,
*Streptomyces aureus* (Waksman and Curtis) Waksman and Henrici,
*Streptomyces gougeroti* (Duche) Waksman and Henrici,
*Streptomyces griseoflavus* (Krainsky) Waksman and Henrici, etc.

Strains of these microorganisms are all preserved at the Institute for Fermentation, Osaka, Japan, and are all available therefrom, and they also are easily obtainable from such culture collections in various countries as American Type Culture Collection, Washington, D.C., Northern Utilization Research Branch of United States Department of Agriculture, Peoria, Ill., and Centraal bureau voor Schimmelcultures, Baarn, Holland. Besides the above exemplified microorganisms, any microorganism producing ribonuclease can be used in the method of this invention.

When the method of the present invention is effected by a culture method, the most suitable medium is selected in accordance with the kind and nature of the microorganism used, but any of the culture media used for incubating ordinary microorganisms may be employed. That is, starch, dextrin, sucrose, lactose, maltose, glycerin, etc. may be employed as carbon source, and peptone, meat extract, yeast or its extract, soy-bean powder, cornsteep, gluten, urea, ammonium salts, nitrates, etc. may conveniently be employed as nitrogen source. If necessary, inorganic salts of such metals as magnesium, calcium, potassium, sodium and a trace of copper, iron, manganese, cobalt,etc. may be added. Or the incubation may be conducted on a medium containing a trace element, etc. In some cases, ribonucleic acid or oligoribonucleotide itself may be utilized as a nutrient source.

The reaction proceeds by contact between ribonucleic acid or oligoribonucleotide and microorganisms or their enzyme system. When living cells of the microorganism are used, ribonucleic acid or oligoribonucleotide may be added to the medium at a stage of the incubation, or the microorganism may be incubated on a medium containing the starting material. When the enzyme system of the microorganism is used, the culture filtrate or cell suspension of the microorganism, or the extracted enzyme thereof may be brought into contact with the starting material in the presence or absence of a convenient medium. If the culture filtrate or cell suspension is employed, a medium is in most cases unnecessary.

When a medium is used, water or an aqueous solvent serves for the purpose and the latter may be, for example, an aqueous solution of a salt such as a buffer solution. The concentration of the starting material in the medium, including culture filtrate or cell suspension, may suitably be over several percent.

The reaction is conducted at a pH most suitable for the exhibition of enzymatic activity even when the extracted enzyme is used, not to speak of the case when living cells are used. Such a pH may be nearly neutral, e.g. higher than 4 and lower than 10. The reaction temperature should not weaken the enzymatic activity too much and destroy the enzyme system. The temperature is more or less variable according to the kind of the microorganism used or other conditions, and may ordinarily be in the range between 30 and 45° C. The reaction time is also variable in accordance with such conditions as the kind of microorganisms, enzyme systems or medium, concentration of the material in medium, reaction temperature, etc., but the reaction must be continued until the objective compound is produced in the highest yield. The reaction conditions may preferably be adjusted so that 15 to 40 hours is required for producing the objective product in the highest yield.

In the method of this invention, an accelerator may be added to the reaction system to stimulate the enzyme activity. Such an agent is, for example, selected from salts of bivalent metals such as magnesium.

In most cases, however, phosphomonoesterase exists in the enzyme system of the microorganisms, and therefore the reaction does not stop at 5'-nucleotides but further proceeds to nucleosides. In such a case, the product may be a mixture composed of nucleosides such as adenosine, guanosine, citydine, uridine, inosine, xanthosine, etc. or deoxynucleosides derived therefrom.

Thus if 5'-nucleotides alone are desired, phosphomonoesterase must be removed from the enzyme system by a purification process, or the action of the phosphomonoesterase has to be obstructed. In order to obstruct the action of the phosphomonoesterase, a phosphomonoesterase inhibitor may be added to the enzyme system. As such an agent there may be used phosphates, arsenates, cyanates, amino acids such as cystein and glutamic acid, ethylenediamine tetraacetic acid, metal ions such as zinc ion and cupric ion, for instance. In a certain enzyme system, deaminase co-exists with ribonuclease, and deaminated compounds may contaminate the product in such a case. Such reaction, however, may preferably be utilized for obtaining deamination products such as inosinic acid.

In the method of this invention, when the phosphomonoesterase activity of the enzyme system is considerably high, use of a phosphomonoesterase inhibitor gives a mixture chiefly consisting of 5'-nucleotides, while non-use of the said inhibitor gives a mixture chiefly consisting of nucleosides. In both cases, some oligonucleotides are usually admixed with the desired product. Even when a phosphomonoesterase inhibitor is used, admixture in the product of nucleosides is sometimes unavoidable.

As is evident from the foregoing, the product may be obtained as a complex mixture comprising various kinds of compounds, and therefore it is convenient that the reaction be terminated at the time when the concentration of the objective compound in the reaction mixture is the highest, the progress of the hydrolysis being traced by measuring the concentration. The measurement of the concentration may be conducted utilizing a known method such e.g. as an enzymatic process, paper-electrophoresis and paper-chromatography.

From the mixture thus produced which contains chiefly 5'-nucleotides and/or nucleosides, the objective substances can be isolated, respectively, or obtained as their mixture, utilizing differences in physico-chemical properties between impurities and the objective substances. Differences in solubility, distribution coefficient between two solvents, absorbability, dialysability, precipitability, etc. are physico-chemical properties to be utilized for the purpose. Or, a precipitation supplement may be added for the same purpose. The 5'-nucleotides may conveniently be isolated as their organic or inorganic salts, for instance, as salts with barium, calcium, potassium, ammonium, amino acids, cyclohexylamine, and brucine.

The process for separating and purifying each component of the mixture may be conducted through a method which is known itself, such as chromatography. An example of the method is concretely explained hereunder:

Insoluble impurities are first removed from the mixture by filtration, then the active substances are adsorbed on an activated charcoal. The adsorbed substances are eluted with a convenient solvent such as dilute hydrochloric acid, dilute ammonia or alcohol. Then the ultraviolet absorption of each fraction is measured, and each fraction containing a component is collected and concentrated. If the product is collected as its barium salt, the subsequent purification can be conducted more conveniently.

The above process is an example of column chromatography on activated charcoal, and the other processes such as ion-exchange chromatography on ion-exchanger or counter-current distribution process can also be utilized for the same purpose.

The following examples are illustrations of presently preferred embodiments of the invention, but they are not intended to limit the scope of this invention. In the example, the temperatures are all in degrees centigrade and are all uncorrected, and the percentages are all in weight percent; and the abbreviations AMP, GMP, UMP, CMP and IMP mean adenosine monophosphate, guanosine monophosphate, uridine monophosphate, cytidine monophosphate and inosine monophosphate, respectively. The nucleic acid used for the starting materials of the examples is that produced from yeast in conventional manner, except when otherwise noted. The names of culture collections abbreviated as IFO, NRRL, ATCC and CBS are Institute for Fermentation, Osaka, Japan, Northern Utilization Research Branch of U.S. Department of Agriculture, Peoria, Ill., American Type Culture Collection, Washington, D.C., U.S.A. and Centraalbureau voor Schimmelcultures, Baarn, Holland, respectively.

*Example 1*

A strain of *Streptomyces albogriseolus* Benedict, Shotwell and Pridham is incubated for 24 hours at a temperature of 28° on an aqueous medium, whose pH is 7.0, composed of 5.0% of soluble starch, 3.0% of cornsteep liquor, 0.1% of ammonium sulfate, 0.05% of hydrous magnesium sulfate, 0.5% of peptone and 0.2% of calcium carbonate. On 100 liters of the same medium in a tank is inoculated 500 milliliters of the culture described above, then the incubation is conducted at a temperature of 28° for 30 hours. A suspension of 1 kilogram of ribonucleic acid in 200 liters of water is adjusted to pH 7.8 with an aqueous solution of sodium hydroxide. To the solution is added 100 liters of the culture filtrate of the above culture, then sodium arsenate is added until its concentration in the solution is 10 millimole per liter, then the pH is adjusted to 8.0. After the addition of 500 grams of toluene for the purpose of antisepsis, hydrolysis is conducted at a temperature of 37° for 16 hours keeping the pH at 7.5–8.0. The reaction mixture is filtered, and the pH of the filtrate is lowered to 2.5. After the product in the filtrate has been absorbed on activated charcoal, it is eluted with 1.5% aqueous ammonia. Nucleotides in the eluate are separated with the aid of an ion exchange resin, and the friction containing 5'-AMP is collected. The fraction containing 5'-AMP is deaminated with sodium nitrate to obtain 100 grams of 5'-IMP. From the other fractions, 5'-GMP, 5'-UMP, and 5'-CMP are collected, and the respective yields are 55 grams, 70 grams and 78 grams.

The strain of *Streptomyces albogriseolus* is distributed by NRRL under the number of B–1305, through Institute for Applied Microbiology of Tokyo University and Faculty of Agriculture, University of Tokyo.

Example 2

A strain of *Streptomyces aureus* (Waksman and Curtis) Waksman and Henrici is incubated with shaking for 24 hours at a temperature of 28° in an aqueous medium, whose pH is 7.0, composed of 5.0% of soluble starch, 1.0% of meat extract, 0.05% of hydrous magnesium sulfate and 0.5% of sodium chloride. On 100 liters of a medium having the same composition as the above is inoculated 500 milliliters of the above seed culture, and the incubation is conducted for 45 hours at a temperature of 28° in a tank.

To a suspension of 1 kilogram of ribonucleic acid in 200 liters of water are added 100 liters of the culture filtrate of the above culture, an aqueous solution of sodium hydroxide to make the pH of the mixture 7.8, and sodium arsenate to make its concentration in the mixture 10 millimole per liter, successively. After the pH of the mixture is adjusted to 8.0, 500 grams of toluene is added for the purpose of antisepsis. Then hydrolysis is conducted for 20 hours at a temperature of 37° keeping the pH at 7.5–8.0. The reaction mixture is filtered, and the pH of the filtrate is lowered to 3.0. After the product in the filtrate has been absorbed on activated charcoal, it is eluted with 1.5% aqueous ammonia. From the eluate are separated with the aid of an ion-exchange resin 5'-IMP, 5'-UMP, 5'-GMP, and 5'-CMP, and their respective yields are 120 grams, 75 grams, 90 grams and 95 grams.

The strain of *Streptomyces aureus* used in this example is designated as Ogata strain No. 1031 and is deposited at IFO under the accession number IFO–3303, and also at ATCC under the accession number ATCC–13404.

Example 3

A strain of *Streptomyces viridochromogenes* (Krainsky) Waksman and Henrici is incubated at a temperature of 28° for 24 hours on an aqueous medium, whose pH is 7.0, composed of 3.0% of soluble starch, 1.0% of peptone, 0.5% of meat extract, 0.05% of hydrous magnesium sulfate, 0.1% of potassium phosphite. On 100 liters of a medium having the same composition as the above is inoculated 500 milliliters of the above seed culture and the incubation is conducted for 60 hours at a temperature of 28° in a tank.

To a suspension of 1 kilogram of ribonucleic acid in 200 liters of water are added an aqueous solution of sodium hydroxide to make the pH of the mixture 7.8, and 100 liters of the culture filtrate of the above culture, successively. Then hydrolysis is conducted at a temperature of 37° for 30 hours while the pH is kept at 8.0. As the culture filtrate contains phosphomonoesterase in high activity, the ribonucleic acid is almost quantitatively hydrolyzed into nucleosides. From the hydrolyzate are collected adenosine, guanoside, cytidine and uridine, and their respective yields are 150 grams, 110 grams, 130 grams and 140 grams.

The strain of *Streptomyces viridochromogenes* used in this example is a strain distributed by CBS. The strain was originally sent to the said culture collection from Dr. S. A. Waksman, Rutgers University, New Brunswick, New Jersey.

Example 4

A strain of *Streptomyces purpurescens* Lindenbein is incubated at a temperature of 28° for 15 hours on an aqueous medium, whose pH is 7.0, composed of 3.0% of soluble starch, 1.0% of peptone, 0.5% of yeast extract, 0.5% of hydrous magnesium sulfate, 0.05% of calcium carbonate and 0.1% of sodium chloride. To 100 liters of the culture filtrate of the above culture is added 1 kilogram of ribonucleic acid, followed by sodium arsenate to make its concentration in the mixture 10 millimole per liter. Then hydrolysis is conducted at a temperature of 37° for 20 hours while the pH is kept at 7.5–8.0. From the hydrolyzate are collected 5'-AMP, 5'-GMP, 5'-CMP and 5'-UMP, and their respective yields are 85 grams, 70 grams, 80 grams and 75 grams. Both nucleosides and oligonucleotides are collected from the residues.

The strain of *Streptomyces pruprescens* used in this example is a strain stored at IFO under the accession number of IFO–3389, and was originally distributed from NRRL under the number of B–1454, via National Institutes of Health, Bethesda, Maryland.

Example 5

A strain of *Streptomyces coelicolor* (Müller) Waksman and Henrici is incubated in a tank for 15 hours at a temperature of 28° in an aqueous medium, whose pH is 7.0, composed of 5.0% of soluble starch, 3.0% of cornsteep liquor, 1.0% of peptone, 0.05% of ammonium sulfate, 0.2% of calcium carbonate and 0.2% of sodium chloride. To 100 liters of the culture filtrate of the above culture is added 1 kilogram of ribonucleic acid, and the mixture is left standing for 16 hours at a temperature of 37°. From the hydrolyzate are collected 5'-AMP, 5'-GMP, 5'-CMP and 5'-UMP, and their respective yields are 55 grams, 30 grams, 45 grams and 48 grams. A part of the hydrolyzate is collected as adenosine, guanosine, cytidine and uridine, as the result of dephosphorilation.

The strain of *Streptomyces coelicolor* is a strain stored at IFO under the accession number of IFO–3807, and at ATCC under the accession number of ATCC–13405.

Example 6

A strain of *Helminthosporium sigmoideum* var. *irregulare* Cralley and Tullis is incubated for 45 hours at a temperature of 28° in an aqueous medium, whose pH is 7.0, composed of 5.0% of glucose, 1.0% of peptone, 1.0% of soybean powder, 0.5% of hydrous magnesium sulfate, 0.1% of potassium phosphite, and 0.2% of sodium chloride in a tank. To a suspension of 1 kilogram of ribonucleic acid in 200 liters of water is added 100 liters of the culture filtrate of the above culture, and sodium arsenate is added to make its concentration in the mixture 10 millimoles per liter. Then hydrolysis is conducted at a temperature of 37° for 16 hours while the pH is kept at 7.5–8.0. From the hydrolyzate there are collected 5'-AMP, 5'-GMP, 5'-UMP, and 5'-CMP, and their respective yields are 70 grams, 50 grams, 65 grams and 65 grams. Further, adenosine, guanosine, cytidine and uridine are collected from a part of the residues, as the result of dephosphorilation.

The strain of *Helminthosporium sigmoidium* var. *irregulare* used in this example is deposited in IFO under the accession number IFO–5273, and at ATCC under the accession number ATCC–13406.

Example 7

A strain of *Bacillus brevis* Migula emend. Ford is incubated in a tank at a temperature of 28° for 60 hours in an aqueous medium, whose pH is 7.0, composed of 5.0% of soluble starch, 1.0% of peptone, 1.0% of meat extract, 0.1% of potassium phosphite and 0.5% of sodium chloride. To a solution of 1 kilogram of ribonucleic acid in 200 liters of water are added 100 milliliters of the culture filtrate of the above culture, and sodium arsenate to make its concentration in the mixture 10 millimoles per liter, in this order. Then hydrolysis is conducted for 20 hours at a temperature of 37° while the pH is kept at 7.5–8.0. From the hydrolyzate are collected 5'-AMP, 5'-GMP, 5'-UMP and 5'-CMP, and their respective yields are 90 grams, 70 grams, 80 grams and 85 grams.

The strain of *Bacillus brevis* used in this example is distributed from ATCC under the accession number of ATCC–8185.

*Example 8*

A strain of *Bacillus subtilis* Cohn emend. Prazmowski is inoculated in a tank for 45 hours at a temperature of 28° in an aqueous medium, whose pH is 7.0, composed of 5.0% of glucose, 1.0% of peptone, 1.0% of meat extract, 0.1% of potassium phosphite, 0.05% of hydrous magnesium sulphate and 0.2% of sodium chloride. One kilogram of ribonucleic acid is dissolved in 100 liters of the culture filtrate of the above culture, then hydrolysis is conducted for 16 hours at a temperature of 37° keeping the pH of the mixture at 7.5–8.0. From the hydrolyzate are collected 5'-AMP, 5'-GMP, 5'-UMP and 5'-CMP, and their respective yields are 60 grams, 45 grams, 50 grams and 55 grams. Further, adenosine, guanosine, uridine and cytidine can be collected from the residues, because the culture filtrate contains phosphomonoesterase and therefore the hydrolysis is effected via the 5'-nucleotides.

The strain of *Bacillus subtilis* used in this example was isolated by Dr. C. Matsumura of IFO, and is deposited in both Institute for Fermentation, Osaka, and American Type Culture Collection, Washington, D.C., U.S.A., under the accession number of IFO–3032, ATCC–13407, respectively.

*Example 9*

A strain of *Streptomyces coelicolor* is incubated for 15 hours at a temperature of 28° in a tank on an aqueous medium, whose pH is 7.0, composed of 5.0% of soluble starch, 3.0% of cornsteep liquor, 1.0% of peptone, 0.05% of hydrous magnesium sulfate, 0.1% of ammonium sulfate, 0.2% of calcium carbonate and 0.2% of sodium chloride.

To an aqueous extract, which was made from 10 kilograms of yeast and 150 liters of water at a pH of 7–9 under heating, are added 35 liters of the culture filtrate of the above culture, and sodium arsenate to make its concentration in the mixture 10 millimoles per liter, successively. Then hydrolysis is conducted at a temperature of 37° for 20 hours while the pH is kept at 7.5–8.0. From the hydrolyzate are collected 5'-AMP, 5'-GMP, 5'-CMP and 5'-UMP, and their respective yields are 110 grams, 70 grams, 90 grams and 80 grams. Further, nucleosides and oligonucleotides are collected from the residues.

The strain of *Streptomyces coelicolor* used in this example is the same strain as used in Example 5.

This example illustrates the fact that the unrefined ribonucleic acid-containing substance, aqueous yeast extract, can also be used for the starting material. The extract contains both ribonucleic acid and oligoribonucleic acid.

In the preceding examples, the yeast from which ribonucleic acid is produced is bakery yeast, but the other yeasts such as brewery yeast also give similar results as above. An anion exchange resin "Dowex 1 X–8" (sold by Dow Chemical Company, Midland, Mich., U.S.A.) or "Amberlite CG–400 (Type 1)" (sold by Rohm & Haas Company, Philadelphia, Pa., U.S.A.) is used in Examples 1 and 2.

Both 5'-nucleotides and nucleosides produced by the method of this invention are useful compounds as reagents of biochemical researches or therapeutics or their intermediates. Besides these utilities, the former compounds have an other utility, which is regarded to be one of the most important utilities of the compounds, in enhancing natural flavors of foods likewise monosodium glutamate.

What is claimed is:

1. A microbiological process for hydrolyzing a member selected from the group consisting of ribonucleic acid, oligoribonucleotides and a mixture thereof into a member selected from the group consisting of 5'-nucleotides, nucleosides and a mixture thereof, which comprises bringing the said starting material into contact with ribonuclease-containing enzyme system produced from a microorganism selected from the group consisting of

*Fusarium roseum* Link,
*Fusarium solani* (Mart.) Appel and Wollenweber,
*Verticillium niveostratosum* Lindau,
*Gliomastix convoluta* (Harz.) Mason var. *felina* (Marchal) Mason,
*Helminthosproium sigmoideum* var. *irregulare* Cralley and Tullis,
*Bacillus subtilis* Cohn emend. Prazmowski,
*Bacillus brevis* Migula emend. Ford,
*Streptomyces griseus* (Krainsky emend. Waksman et al.) Waksman et al.,
*Streptomyces coelicolor* (Müller) Waksman and Henrici,
*Streptomyces flavus* (Krainsky) Waksman and Henrici,
*Streptomyces lavendulae* (Waksman and Curtis) Waksman and Henrici,
*Streptomyces ruber* (Krainsky) Waksman and Henrici,
*Streptomyces viridochromogenes* (Krainsky) Waksman and Henrici,
*Streptomyces purpurescens* Lindenbeim,
*Streptomyces albogriseolus* Benedict et al.,
*Streptomyces olivochromogenus* (Bergey et al.) Waksman and Henrici,
*Streptomyces aureus* (Waksman and Curtis) Waksman and Henrici,
*Streptomyces gougeroti* (Duche) Waksman and Henrici,
*Streptomyces griseoflavus* (Krainsky) Waksman and Henrici,
and isolating the desired hydrolyzate component.

2. A microbiological process according to claim 1, wherein the hydrolysis is carried out in the presence of a phosphomonoesterase inhibitor.

3. A microbiological process according to claim 1, wherein each component of the resultant hydrolyzate is separated by column chromatography on activated charcoal, and thereafter collecting each component from the eluate of the chromatography by concentration.

4. A microbiological process according to claim 3, wherein the products are collected as their barium salts.

5. A microbiological process according to claim 3, wherein the products are collected as their calcium salts.

6. A microbiological process according to claim 3, wherein the products are collected as their cyclohexylamine salts.

7. A microbiological process according to claim 1, wherein the microorganism is incubated on a nutrient material containing the said starting material.

8. A microbiological process according to claim 1, wherein the said starting material is admixed with the culture filtrate of said microorganism.

9. A microbiological process according to claim 1, wherein the said starting material is admixed with the cell suspension of said microorganism.

10. A process according to claim 1, wherein the said starting material is treated with extracted enzyme of said microorganism in an aqueous medium.

11. In the hydrolysis of a member selected from the group consisting of ribonucleic acid, oligoribonucleotides and a mixture thereof into a member selected from the group consisting of 5'-nucleotides, nucleosides and a mixture thereof, the improvement of effecting said hydrolysis microbiologically by means of ribonuclease-containing enzyme system produced from a microorganism selected from the group consisting of

*Fusarium roseum* Link,
*Fusarium solani* (Mart.) Appel and Wollenweber,
*Verticillium niveostratosum* Lindau,

*Gliomastix convoluta* (Harz.) Mason var. *felina* (Marchal) Mason,
*Helminthosporium sigmoideum* var. *irregulare* Cralley and Tullis,
*Bacillus subtilis* Cohn emend. Prazmowski,
*Bacillus brevis* Migula emend. Ford,
*Streptomyces griseus* (Krainsky emend. Waksman et al.) Waksman et al.,
*Streptomyces coelicolor* (Müller) Waksman and Henrici,
*Streptomyces flavus* (Krainsky) Waksman and Henrici,
*Streptomyces lavendulae* (Waksman and Curtis) Waksman and Henrici,
*Streptomyces ruber* (Krainsky) Waksman and Henrici,
*Streptomyces viridochromogenes* (Krainsky) Waksman and Henrici,
*Streptomyces purpurescens* Lindenbeim,
*Streptomyces albogriseolus* Benedict et al.,
*Streptomyces olivochromogenus* (Bergey et al.) Waksman and Henrici,
*Streptomyces aureus* (Waksman and Curtis) Waksman and Henrici,
*Streptomyces gougeroti* (Duche) Waksman and Henrici,
*Streptomyces griseoflavus* (Krainsky) Waksman and Henrici,
in the presence of a phosphomonoesterase inhibitor, and isolating the desired hydrolyzate component.

12. A process for preparing 5'-nucleotides which comprises degrading ribonucleic acid with a ribonuclease-containing enzyme from a microorganism of the genus Streptomyces.

13. A process for preparing 5'-nucleotides which comprises degrading ribonucleic acid with a ribonuclease-containing enzyme from *Streptomyces coelicolor*.

14. A process for preparing 5'-nucleotides which comprises degrading ribonucleic acid with a ribonuclease-containing enzyme from *Streptomyces griseus*.

15. A process for preparing 5'-nucleotides which comprises degrading ribonucleic acid with a ribonuclease-containing enzyme from *Streptomyces flavus*.

16. A process for preparing 5'-nucleotides which comprises degrading ribonucleic acid with a ribonuclease-containing enzyme from *Streptomyces lavendulae*.

17. A process for preparing 5'-nucleotides which comprises degrading ribonucleic acid with a ribonuclease-containing enzyme from *Streptomyces ruber*.

18. A process for preparing 5'-nucleotides which comprises degrading ribonucleic acid with a ribonuclease-containing enzyme from *Streptomyces viridochromogenes*.

19. A process for preparing 5'-nucleotides which comprises degrading ribonucleic acid with a ribonuclease-containing enzyme from *Streptomyces purpurescens*.

References Cited in the file of this patent
UNITED STATES PATENTS 3,104,171    Sakaguchi et al. _____ Sept. 17, 1963

OTHER REFERENCES

Colowick et al.: Methods of Enzymology, vol. III (1957), QP601C72, pp. 835 to 840.

Sumner et al.: "The Enzymes," published by Academic Press Inc., New York, 1950, vol. 1, part 1, pages 483, 486 to 491 and 494 to 497, and vol. 1, part 2, pages 961 and 962.

Colowick et al.: "Methods in Enzymology," vol. III, 1957, pages 723 to 726, 730 to 747, 755, 756 and 770 to 775.